Feb. 6, 1934. E. NEURATH 1,946,177
CLUTCHING MECHANISM
Filed Oct. 21, 1930  2 Sheets-Sheet 1
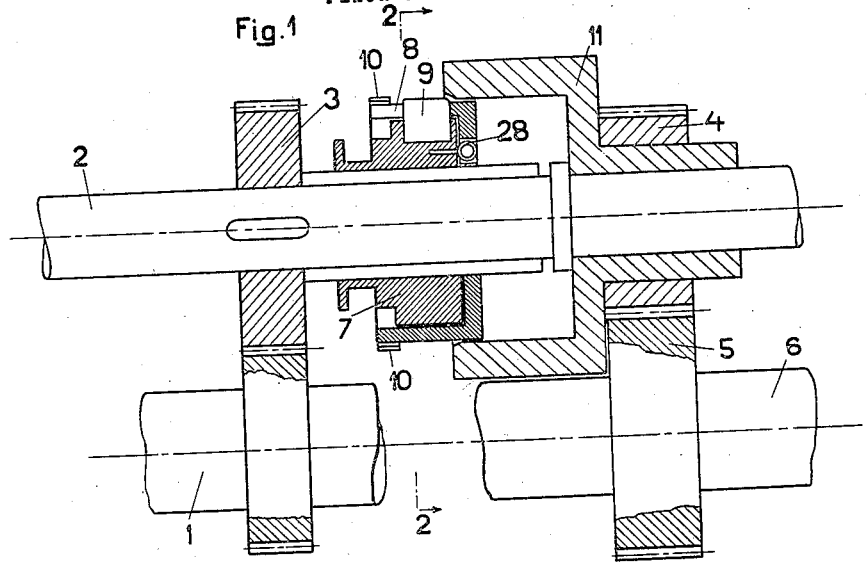
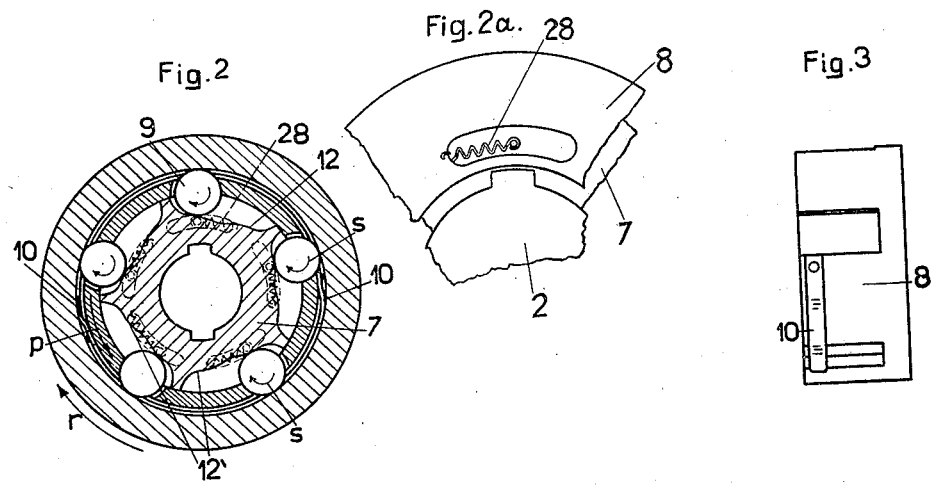
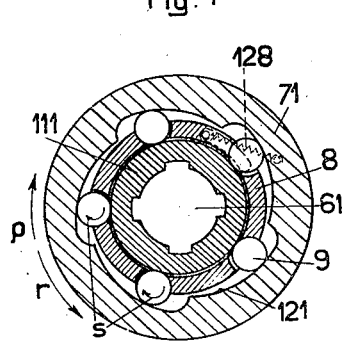
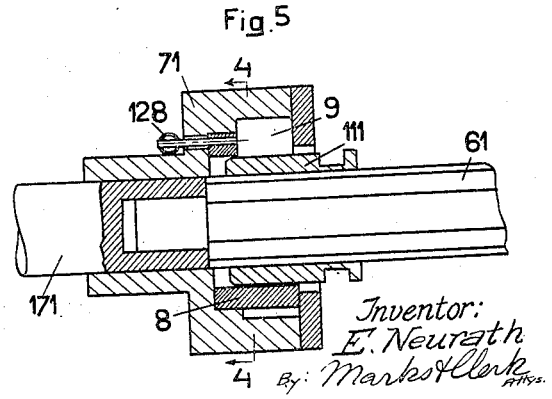
Inventor:
E. Neurath
By Marks & Clerk Attys.

Feb. 6, 1934. E. NEURATH 1,946,177
CLUTCHING MECHANISM
Filed Oct. 21, 1930 2 Sheets-Sheet 2
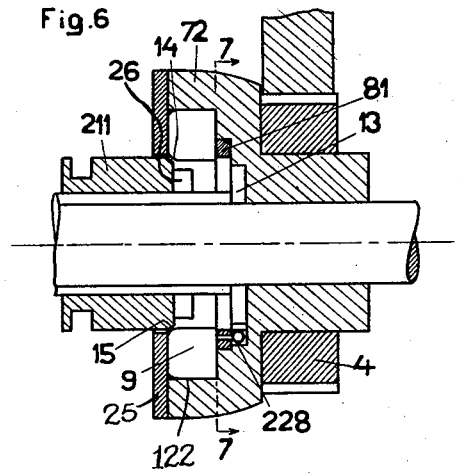
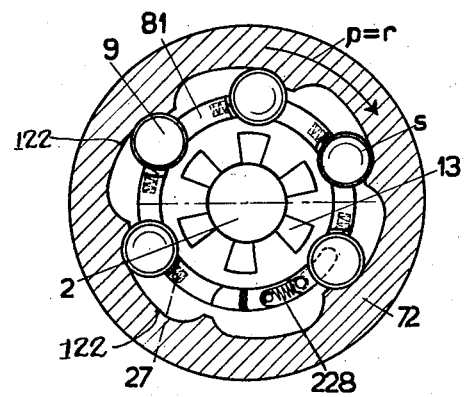
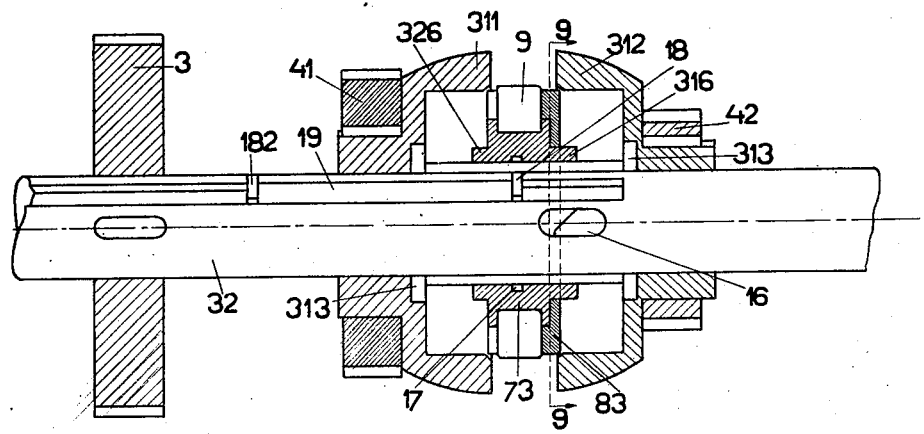
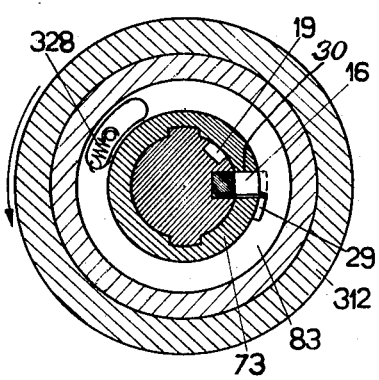
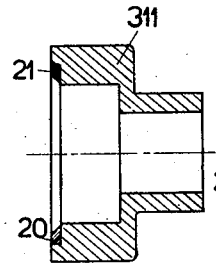
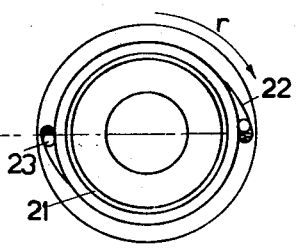
Inventor:
E. Neurath
By Marks & Clerk Attys.

Patented Feb. 6, 1934

1,946,177

UNITED STATES PATENT OFFICE 1,946,177

CLUTCHING MECHANISM

Egon Neurath, Kai, Vienna, Austria

Application October 21, 1930, Serial No. 490,271, and in Austria November 2, 1929

13 Claims. (Cl. 192—48)

This invention relates to a clutching mechanism which is particularly useful in change speed gear mechanisms for automobiles, but may be applied to other machinery for which it is also suitable.

The invention has for its main object to enable the gears of a speed change gear mechanism to be changed in a perfectly easy and smooth manner without the driver being obliged to declutch.

The invention is illustrated in the accompanying drawings wherein:—

Fig. 1 is a longitudinal section through a part of a change speed gear mechanism provided with a clutching mechanism constructed in accordance with the invention, Fig. 2 being a section taken on line 2—2 of Fig. 1, Fig. 2a is an enlarged view of a detail and Fig. 3 a side view of a single part of the mechanism;

Figs. 4 and 5 show the application of the clutching mechanism to the direct drive of a gear mechanism, Fig. 4 being a section taken on line 4—4 of Fig. 5 and Fig. 5 being a longitudinal section;

Figs. 6 and 7 show a modification of the construction shown in Figs. 1, 2 and 3, Fig. 7 being a section taken on line 7—7 of Fig. 6 and Fig. 6 being a longitudinal section;

Fig. 8 shows the application of the invention to a clutch intended to engage alternately with two wheels, Fig. 9 being a section taken on line 9—9 of Fig. 8;

Figs. 10 and 11 show certain details of this clutching mechanism.

The driving shaft 1 (Fig. 1) has keyed on it a gear, which meshes with a gear 3 keyed on the countershaft 2. A gear 4 is fixed on a portion of reduced diameter of a cylinder 11, rotatably mounted upon the countershaft 2 but not slidable thereon. The gear 4 is in constant mesh with a gear 5 keyed on a shaft 6 connected to the differential.

In accordance with the invention, a member 7 having cam surfaces 12 is slidably mounted upon the shaft 2 but not rotatable thereon, this member being surrounded by a ring 8 serving as a cage for the rollers 9. The member 7 can be moved into and out of the cylinder 11.

When the countershaft 2 with the member 7 thereon is rotated by means of shaft 1 driven by the motor, the rollers 9 are pressed by means of the said cam-surfaces 12 against the inner surface of cylinder 11, which is thus also rotated.

In accordance with the invention the clutching mechanism is moreover constructed in such a way that the driving and the driven member can be brought into operative relationship with one another only when the speed of revolution of the driving member is lower or at the most equal to that of the driven member 11. Otherwise the sudden equalization of the velocity of the driving and the driven member would cause considerable shocks in all the power-transmitting members, which would consequently soon be destroyed. In order to avoid this, the roller cage 8 is turned relatively to the member 7 by a tension spring 28 having its ends fixed to the member 7 and the cage 8 respectively (Fig. 2a) in the direction of arrow $p$, in the sense contrary to the sense of rotation of shaft 2 denoted by arrow $r$. When the member 7 is out of cylinder 11, this spring causes the rollers to roll upon the summits of the cam surfaces 12, where they are at their maximum radial distance from the centre of shaft 2 (Fig. 2).

Assuming that the car is already running, when the member 7 is shifted by means of the speed-changing lever towards the cylinder 11 the rollers 9 will come into contact with the bevelled edge at the open end of the cylinder 11, whereby the member 7 is positively prevented from entering the cylinder 11, until the driver takes his foot off the accelerator so that the member 7 driven by the motor lags behind the member 11 driven by the running car. The cylinder 11 is thus performing a rotation in the direction of arrow $r$ also in relation to the member 7 imparting thereby a rotary movement in the direction of the arrows $s$ to the rollers 9 which (due to the axially directed force exerted by means of the speed-changing lever upon member 7) are in frictional engagement with the bevelled edge of the cylinder 11. Under the influence of this rotary movement the rollers 9 are rolled down the cam-surfaces 12 against the action of the tension spring 28. As soon as the diameter of the cylinder wrapping all the rollers becomes equal to the internal diameter of the hollow cylinder 11 the member 7 can be moved into the cylinder 11. When now the motor is again accelerated the gear 4 will be coupled to shaft 2 by means of the cam-surfaces and the rollers.

In order to permit the motor to be used as a brake, cam-surfaces 12' are provided, symmetrical to the cam-surfaces 12 so as to enable the rollers 9 to be pressed against the surface of the cylinder 11 also when the roller cage 8 is turned in the sense opposite to arrow $p$, i. e. in the direction of rotation $r$. It is evident that in this position of the ring 8 the rotation of the cylinder 11 driven by the car will be transmitted to the countershaft 2 connected up to the motor.

When the engine brake is to be brought into operation the member 7 has to be moved entirely into the cylinder 11 so that the springs 10 provided upon the outer edge of the ring 8 (Fig. 3) will also enter the cylinder. These springs press against the wall of the cylinder so that the ring 8 is turned with respect to the member 7 against the tension of the spring 28 in the direction of the arrow r when the cylinder 11 is overrunning the member 7. Thus the cylinder 11 is enabled to transmit its rotary motion to the member 7.

When the engine brake is to be put into operation the main clutch has to be disconnected so as to free the rollers from pressure.

According to Figs. 4 and 5 the member 71 is secured to the shaft 171 and is made hollow so as to receive in its interior the cylinder 111 slidably mounted upon shaft 61. The cam-surfaces 121 are provided upon the inner periphery of the member 71, the roller cage 8 being connected to the part 71 by a spring 128 which tends to hold the rollers upon the summits of the cams. The mode of action of this clutching mechanism is analogous to that of the mechanism described in Figs. 1, 2 and 3.

As long as the shaft 171 is rotating faster than the shaft 61 the cylinder 111 is prevented from being shifted into the hollow member 71 by means of the rollers 9. When however by removing the foot from the accelerator the member 71 is made to lag behind the cylindrical member 111, its bevelled edge with which the correspondent bevelled edges of the rollers are engaged by friction imparts to these latter a rotary movement indicated by the arrows s so that the rollers are rolled outwards on the cams until the cylinder 111 is enabled to be shifted into the member 71.

In Figs. 6 and 7 the cam surfaces 122 are also provided upon the inner surface of the hollow member 72, which in this case however constitutes the driven part of the clutching mechanism. According to this embodiment of the invention, the motor brake is engaged by means of claws 13 and 26 provided upon the outer and the inner member respectively. Springs 27 housed in recesses in the cage ring 81 press against the rollers and tend to force the latter as far as possible into the angle formed by the cam surfaces and the periphery of the cylinder, so that the rollers touch the cylinder and the cam surface simultaneously. Thus, all the rollers come into engagement by turning the member 72 in the direction of rotation r relatively to the member 211. The plate 25 disposed at the opening of the cylinder 211 is intended to prevent any axial displacement of the rollers 9.

Assuming that the members of the clutch are moved to interengage one another only to such an extent as to act as a one way clutch and that the car is running at a high speed while the motor is rotating very slowly, the member 72 will rotate relatively to the member 211. Owing to this, the rollers are in constant contact with both members and are subject to rapid wear. In order to prevent this disadvantage, the ring 81 (Figs. 6 and 7) is machined in such a way as to fit the cylindrical member 211 with a minimum of play. If therefore the member 211 lags behind the member 72 rotating at a high speed, it tends, owing to the viscosity of the lubricant to turn the ring 81 in the sense opposite to the arrow p relatively to the member 72 as far as the connecting spring 228 will allow. By this angular displacement of the cage 81 the rollers 9 are brought to places where the cam surfaces are at a greater radial distance from the axis, so that that the rollers are flung outwards by the centrifugal force ceasing thereby to make contact with the cylinder 211 and being thus protected from undue wear.

The clutching mechanism shown in Figs. 6 and 7 may obviously be also used for the direct drive of a speed-change-gear mechanism.

In Figs. 8 and 9, 41 and 42 denote the gears of the second and first speeds, said gears being in constant mesh with gears situated upon a shaft, which, however, are not shown in the drawings. The gears 41, 42 are fixed to the hollow cylinders 311, 312 rotatably mounted on the countershaft 32 but not slidable thereon. The member 73 is adapted to be displaced axially upon the shaft 32 by means of a bar 19, guided in a channel formed in the shaft 32. One end 18 of this bar engages with a groove 17 in the member 73, while the other end 182 is adapted to be engaged by a fork lever (not shown in the drawings) by means of which the bar 19 can be displaced axially.

The first gear must be capable of being engaged even when the driven members are at rest, that is to say even if the driving member is rotating faster than the driven member. For this purpose the inner perimeter of the ring 83 is provided with a groove 29 (Fig. 9) co-operating with a dog 16 on the countershaft, in such a way that the ring 83 is turned against the force of the spring 328 connecting the ring 83 to the member 73 when the latter is displaced towards the cylinder 312. By a slot 30 the member 73 is enabled to pass over the dog 16. By this angular displacement of the ring 83 the rollers are forced to approach the axis, so that they no longer prevent the insertion of the part 73 into the member 312.

The second speed can only be enaged when the driven member 311 is overrunning shaft 32 with the driving members 73. The claws 313, 326 for the engagement of the motor brake are identical to those illustrated in Figs. 6 and 7.

The mechanism shown in Figs. 10 and 11 is intended to prevent possible wear of the bevelled edges of the cylinder 311 and the rollers 9. A ring 20 bevelled at its edge 21 is fitted in annular groove in the cylinder 311, wherein it is enabled to rotate in one direction, whilst its rotation in the opposite direction may be prevented by means of rollers 23 which co-operate with cam-surfaces 22. Assuming that member 73 while rotating in the direction of the arrow r, is moved towards the cylinder 311 while it is overrunning the latter, the ring 20 will be turned with an angular velocity equal to that of the member 73, as soon as the ends of the rollers touch the edge 21 of the ring 20. The member 73 cannot be inserted into the cylinder 311 until the speed of revolution of the member 73 becomes lower than that of cylinder 311, whereupon the ring 20 will rotate with the same angular velocity as the cylinder 311 under the action of the rollers 23 and the cam-surfaces 22, forcing the rollers 9 to roll along the cam-surfaces of the member 73 and to approach the axis of rotation.

A change-speed-gear mechanism provided with a clutching mechanism as hereinbefore described has the following advantages: The gear-changing is effected in a perfectly noiseless and smooth way and does not require any experience on the part of the operator. The gears and the clutches of the gear mechanism are protected from being destroyed by gear-changing. When driving over hilly roads, where it is necessary to change to a lower gear, this change can be done immediately, without declutching and without operating the accelerator. The motor-brake is also operated in an easy manner by accelerating the speed of the motor to such an extent as to drive the car before bringing the claws into engagement, so that the claws move with the same angular velocity at the moment of engagement.

What I claim is:

1. A clutching mechanism comprising a driving member and a driven member displaceable axially one with respect to the other, one of said members being hollow and adapted to receive the other member, one of said members having a smooth circumferential surface and the other member having circumferential cam surfaces and a set of rollers supported thereon so as to be capable of rolling on said cam surfaces and of being pressed by the cam surfaces against the smooth circumferential surface of the other member on the one member being inserted in the other, and means positively operative to prevent the one member from being axially moved into the other so long as the driving member is rotating faster than the driven member.

2. A clutching mechanism comprising a driving member and a driven member displaceable axially one with respect to the other, one of said members being hollow and adapted to receive the other member, one of said members having a smooth circumferential surface and the other member having circumferential cam surfaces and a set of rollers and a cage ring for loosely guiding said rollers on said cam surfaces so as to be capable of rolling on said cam surfaces and of being pressed by the cam surfaces against the smooth circumferential surface of the other member on the one member being inserted in the other, and means connected to said cage ring and the member having the circumferential cam surfaces for holding the rollers in a position to prevent the one member from being axially moved into the other so long as the driving member is rotating faster than the driven member.

3. A clutching mechanism comprising a driving member and a driven member displaceable axially one with respect to the other, one of said members being hollow and adapted to receive the other member, one of said members having a smooth circumferential surface and the other member having circumferential cam surfaces and a set of rollers and a cage ring for loosely guiding said rollers on said cam surfaces so as to be capable of rolling on said cam surfaces and of being pressed by the cam surfaces against the smooth circumferential surface of the other member on the one member being inserted in the other, and a spring connected to said cage ring and the member having the circumferential cam surfaces for holding the rollers in a position to prevent the one member from being axially moved into the other so long as the driving member is rotating faster than the driven member.

4. A clutching mechanism comprising a driving member and a driven member displaceable axially one with respect to the other, one of said members being hollow and adapted to receive the other member, the driving member having circumferential cam surfaces with the directrices thereof descending in the direction of rotation and the driven member having a smooth circumferential surface with a bevelled edge adjacent thereto, a set of rollers supported on the driving member so as to be capable of rolling on said cam surfaces and of being pressed by the cam surfaces against the smooth circumferential surface of the driven member on the one member being inserted in the other, said rollers having bevelled ends adapted to co-operate with the bevelled edge on the driven member, a cage ring for loosely guiding said rollers on said cam surfaces and a spring connected to said cage ring and to the driving member so as to urge the cage ring to turn on the driving member in the direction opposite to the direction of rotation in which the clutching mechanism is operative and hold the rollers upon the summits of the cam surfaces.

5. A clutching mechanism comprising a driving member and a driven member displaceable axially one with respect to the other, one of said members being hollow and adapted to receive the other member, the driven member having circumferential cam surfaces with the directrices thereof ascending in the direction of rotation and the driving member having a smooth circumferential surface with a bevelled edge adjacent thereto, a set of rollers supported on the driven member so as to be capable of rolling on said cam surfaces and of being pressed by the cam surfaces against the smooth circumferential surface of the driving member on the one member being inserted in the other, said rollers having bevelled ends adapted to co-operate with the bevelled edge on the driving member, a cage ring for loosely guiding said rollers on said cam surfaces and a spring connected to said cage ring and to the driven member so as to urge the cage ring to turn on the driven member in the same direction of rotation as that in which the clutching mechanism is operative and hold the rollers upon the summits of the cam surfaces.

6. A clutching mechanism comprising a driving member and a driven member displaceable axially one with respect to the other, one of said members being hollow and adapted to receive the other member, one of said members having a smooth circumferential surface and the other member having circumferential cam surfaces, means supported on said cam surfaces so as to be displaceable thereon and to be pressed by the cam surfaces against the smooth circumferential surface of the other member so as to drive the one member in one direction of rotation only on the one member being axially moved partly into the other and means on said driving and driven members adapted to interengage on the said member being moved further into the other.

7. A clutch mechanism comprising a driving member and a driven member displaceable axially one with respect to the other, one of said members being hollow and adapted to receive the other member, one of said members having a smooth circumferential surface and the other member having circumferential cam surfaces comprising two branches downwardly inclined towards one another, a set of rollers and a cage ring for loosely guiding said rollers on said cam surfaces so as to be capable of rolling upon the cam surfaces and of being pressed against the smooth circumferential surface of the other member on the one member being inserted in the other and the rollers on one of the branches of the cam surfaces, a spring connected to said cage ring and the member having the circumferential cam surfaces for holding the rollers in a position upon the summits of the said branches of the cam surfaces and springs on the periphery of the cage ring at the end thereof remote from the member having the smooth circumferential surface and adapted to press against said surface on the one member being inserted fully into the other.

8. A clutch mechanism as set forth in claim 1 having claws on the driving and driven members positioned thereon so as to be capable of engaging one another on the one member being inserted fully into the other.

9. A clutching mechanism comprising a driving and two smooth driven members, said driving member having cam surfaces thereon and being adapted to be displaced axially to engage alternatively with one of the driven members, a set of rollers on the driving member disposed so as to be capable of rolling upon the said cam surfaces and of being pressed by them against the said smooth driven members and adapted to prevent engagement of the driving and driven members when the rollers are upon the summits of the said cam surfaces, a cage ring for loosely guiding the said rollers, a spring connected to said cage ring and to the driving member and adapted to hold the cage ring and driving member in a relative position wherein the rollers are held upon the summits of the said cam surfaces, and means operatively connected to the ring for turning the latter against the force of the said spring when the said driving member is approached to one of the said driven members.

10. A clutching mechanism comprising a driving and two smooth driven members, said driving member having cam surfaces thereon and being adapted to be displaced axially to engage with the driven members, a set of rollers on the driving member disposed so as to be capable of rolling upon the said cam surfaces and of being pressed by them against the said smooth driven members and adapted to prevent engagement of the driving and driven members when the rollers are upon the summits of the said cam surfaces, a cage ring for loosely guiding the said rollers, a spring connected to the said cage ring and to the said driving member and adapted to hold the cage ring and driving member in a relative position wherein the rollers are held upon the summits of the said cam surfaces, a groove in the cage ring and a bar adapted to co-operate with the said groove provided near one of the said driven members, so as to turn the said ring against the force of said spring when the driving member is approached to the driven member adjacent the bar.

11. A clutching mechanism as set forth in claim 3, in which the cage ring has a peripheral surface adapted to fit the smooth circumferential surface of the cylindrical member with a minimum of play, so as to enable the ring to be turned through the medium of oil admitted between said peripheral and circumferential surfaces.

12. A clutching mechanism as set forth in claim 3 having cavities in the cage ring and springs in said cavities and in contact with the rollers so as to press the rollers against the cam surfaces.

13. A clutching mechanism as set forth in claim 3 having a groove in the member having the smooth circumferential surface in the edge thereof, a ring having a bevelled edge and mounted in said groove so as to be rotatable therein, the rollers having bevelled edges adapted to make contact with said ring on the one member being displaced axially towards the other.

EGON NEURATH.